United States Patent
Supriya et al.

(10) Patent No.: US 11,244,794 B2
(45) Date of Patent: Feb. 8, 2022

(54) CURRENT BALANCING FOR AUTOMATIC TRANSFER SWITCHES

(71) Applicant: Cummins Power Generation IP, Inc., Minneapolis, MN (US)

(72) Inventors: Amrit Supriya, Minneapolis, MN (US); Wangwei Zhou, Shoreview, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 102 days.

(21) Appl. No.: 16/756,975

(22) PCT Filed: Oct. 18, 2018

(86) PCT No.: PCT/US2018/056490
§ 371 (c)(1),
(2) Date: Apr. 17, 2020

(87) PCT Pub. No.: WO2019/079582
PCT Pub. Date: Apr. 25, 2019

(65) Prior Publication Data
US 2021/0193405 A1 Jun. 24, 2021

Related U.S. Application Data

(60) Provisional application No. 62/574,539, filed on Oct. 19, 2017.

(51) Int. Cl.
*H01H 9/54* (2006.01)
*H01H 47/00* (2006.01)
*H01H 9/00* (2006.01)
*H02J 9/06* (2006.01)

(52) U.S. Cl.
CPC .......... *H01H 9/0072* (2013.01); *H02J 9/068* (2020.01); *H01H 2300/018* (2013.01)

(58) Field of Classification Search
CPC .. H01H 9/0072; H01H 2300/018; H02J 9/068
USPC ......................................................... 307/139
See application file for complete search history.

(56) References Cited

U.S. PATENT DOCUMENTS

| | | | |
|---|---|---|---|
| 5,070,252 | A | 12/1991 | Castenschiold et al. |
| 5,581,133 | A | 12/1996 | Smith et al. |
| 6,337,613 | B1 | 1/2002 | Grelier et al. |
| 2003/0155330 | A1 | 8/2003 | Rademacher et al. |
| 2017/0117104 | A1 | 4/2017 | Zhou et al. |

FOREIGN PATENT DOCUMENTS

| CA | 2943784 A1 | 10/2015 |
|---|---|---|
| WO | WO-2009/118119 A1 | 10/2009 |

*Primary Examiner* — Daniel Cavallari
*Assistant Examiner* — Dru Parries
(74) *Attorney, Agent, or Firm* — Foley & Lardner LLP

(57) ABSTRACT

An automatic transfer switch includes a first phase switch component having a first plurality of cassettes, and at least one outer bus component disposed at an outer side of the first phase switch component. The automatic transfer switch additionally includes a first plate which is disposed on the outer side of the first phase switch component at a terminal end of the first phase switch component. The first plate is structured to increase impedance on an outer bus component of the first phase switch component to rebalance current along the first phase switch component.

20 Claims, 12 Drawing Sheets

CURRENT BALANCING FOR AUTOMATIC TRANSFER SWITCHES

CROSS-REFERENCE TO RELATED APPLICATIONS

This application claims the benefit of and priority to U.S. Provisional Application No. 62/574,539, filed Oct. 19, 2017, the content of which is hereby incorporated by reference in its entirety.

TECHNICAL FIELD

The present disclosure relates generally to current rebalancing in automatic transfer switches.

BACKGROUND

Automatic transfer switches (ATS) have a wide range of components and configurations. Certain configurations may subject to the so-called 'skin effect,' in which alternating current tends to primarily flow through outer layers of conductors of the ATS.

SUMMARY

Embodiments described herein relate generally to apparatuses and methods for automatic transfer switching. In some embodiments, laminations of electric steel may be placed on at least one bus conductor or cassette of one or more phases of the automatic transfer switch. The resulting assemblies allow for rebalancing the current distribution against the 'skin effect' back into a more even flow distribution. Further, such embodiments have enhanced current carrying capability, reduced thermal effects, and improved expected lifetimes.

In particular, certain embodiments described herein relate generally to ATS devices, e.g., single phase devices or multi-phase devices in which conductors and cassettes of each phase are physically mounted side-by-side, e.g., in a linear arrangement. Electromagnetic 'skin effect' cross coupling in between conductors and cassettes within each phase of such a configuration may lead to an unbalanced current distribution over the current carrying elements of each of the phases, such that the outer bus conductors and cassettes of each phase carry more current than the inner conductors and cassettes. This can lead to increased thermal effects in these outer conductors and cassettes in addition to causing early de-rating of the ATS due to current limitations on these outer conductors and cassettes. Steel laminations may be placed on the outer bus conductors and/or contact cassettes of one or more phases in an ATS so as to provide increased impedance and to rebalance the current flow in the phase.

Further, in some ATS configurations, the separated groups of contact cassettes may be provided with at least one actuator mechanism. For example, at least one actuator mechanism may be placed at an outside portion of a phase. The at least one actuator may be outfitted with a steel plate, such as a steel face plate, to obtain magnetic isolation. However, parasitic inductive and/or resistive heat losses may increase heat in the system, so as to induce temperature increases in the ATS. Discharging of the resulting heat may be needed, i.e., rejection to the outside environment, in order to ensure that the ATS complies with applicable technical specifications and/or requirements, such as those set forth by Underwriters Laboratories (UL), for example. Moreover, discharging of heat may be needed to avoid de-rating of the ATS. According to at least one embodiment, such parasitic losses are reduced by rebalancing the current flows in each phase of the ATS by placing laminated steel covers on outer bus conductors and/or contact cassettes of the phases to increase their effective impedance and reduce the overall heating effects.

At least one embodiment relates to an automatic transfer switch including a first phase switch component comprising a first plurality of cassettes, at least one outer bus component disposed at an outer side of the first phase switch component, and a first plate disposed on the outer side of the first phase switch component at a terminal end of the first phase switch component, wherein the first plate is structured to increase impedance on an outer bus component of the first phase switch component to rebalance current along the first phase switch component.

Further, at least one embodiment relates to an automatic transfer switch assembly including a first phase switch component comprising a plurality of conductors, wherein the plurality of conductors comprise a plurality of interior conductors disposed between a first outer conductor on a first side of the first phase switch component, and a second outer conductor on a second side of the first phase switch component, wherein at least one of the bus conductors comprises a cut portion configured to increase impedance along the first phase switch component.

Further still, at least one embodiment relates to a method including arranging a first switch component comprising a first plurality of cassettes, the first plurality of cassettes comprising outer cassettes and interior cassettes disposed between the outer cassettes; disposing a first plate on a first outer conductor located at a first outer side of the first switch component at a first terminal end of the first switch component; disposing a second plate on a second outer conductor located at a second outer side of the first switch component at a second terminal end of the first switch component, the first and second outer conductors sandwiching a plurality of interior conductors between the first and second outer conductors, and rebalancing current along the first phase switch component by removing at least one of interior cassettes.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
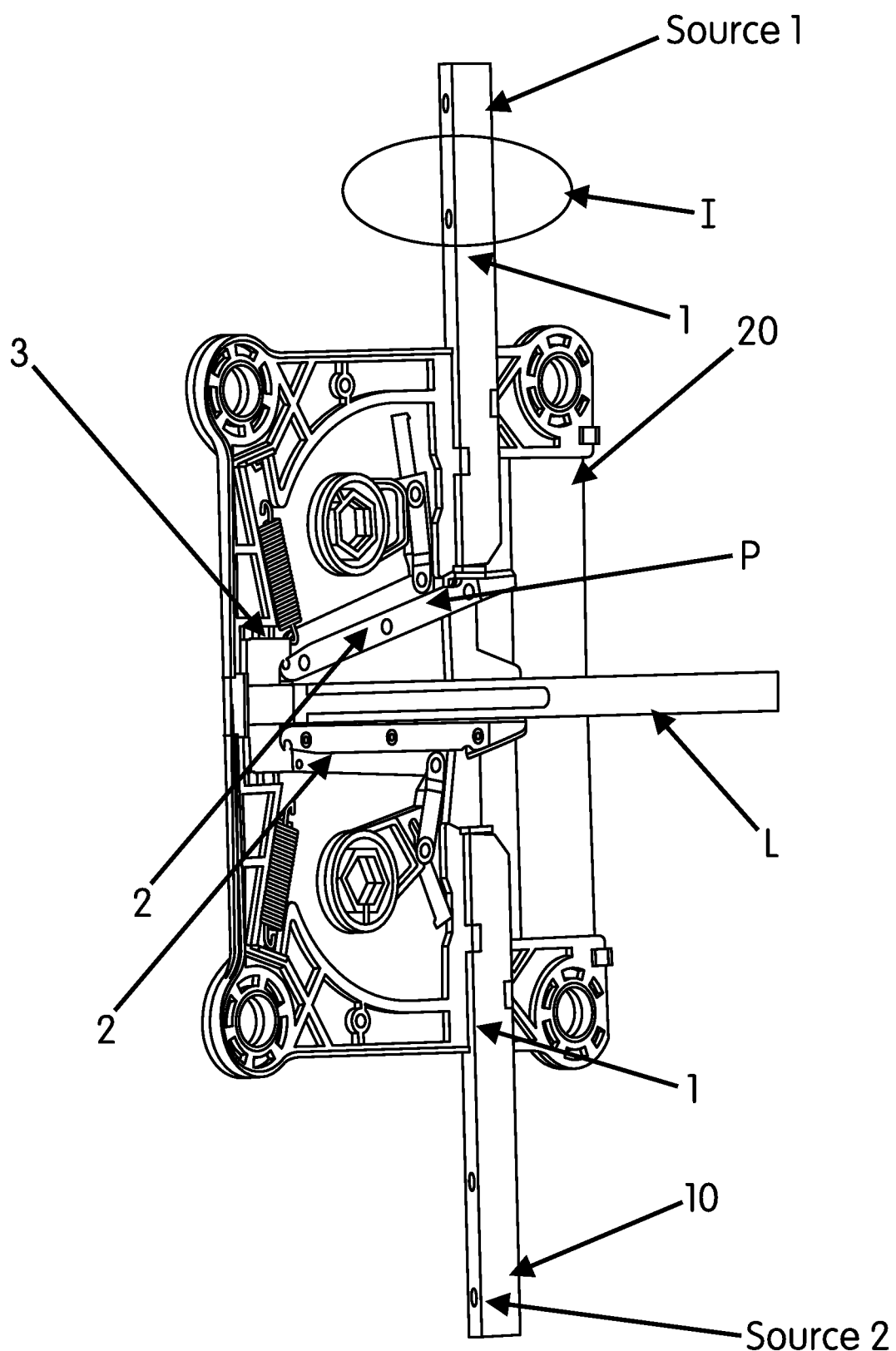
FIG. 1 depicts a cross-sectional view of a cassette assembly of an ATS according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Various exemplary embodiments are provided below relating to automatic transfer switches. Various exemplary embodiments discussed below allow for altering at least one of (1) a spacing of inner conductors, or (2) the impedance of outer conductors, by one or more of (1) adding laminations of electrical steel, ferrite, or other electromagnetically active material, (2) making cuts or slits in the conductors, or (3) utilizing smaller and/or higher resistance conductors. Such alternation beneficially increases the electrical impedance of the outer conductors and pushes the current distribution against the electrical skin effect back into a more even flow distribution. In this manner, overloading or overheating of any particular conductor and/or cassette in an ATS may be avoided. Such techniques cause the current to 'even out' in the conductors to achieve a more regular capability profile for the ATS as a whole.

FIG. 1 depicts components of an ATS assembly according to an embodiment. More particularly, FIG. 1 depicts components of a switching member 10 including a stationary component 1, a movable component 2 and a T-bus component (a T-joint) 3 of the switching member 10. The switching member is connected to a first source (labeled Source 1) and disconnected from a second source (labeled Source 2). The contact location between movable component 2 and stationary component 1 (where the terminal end of the movable component 2 is closest to stationary component 1) is a location where the resistance of the switching member assumes a highest value, that is, a point P of highest resistance, as shown in FIG. 1.

Figure 2:
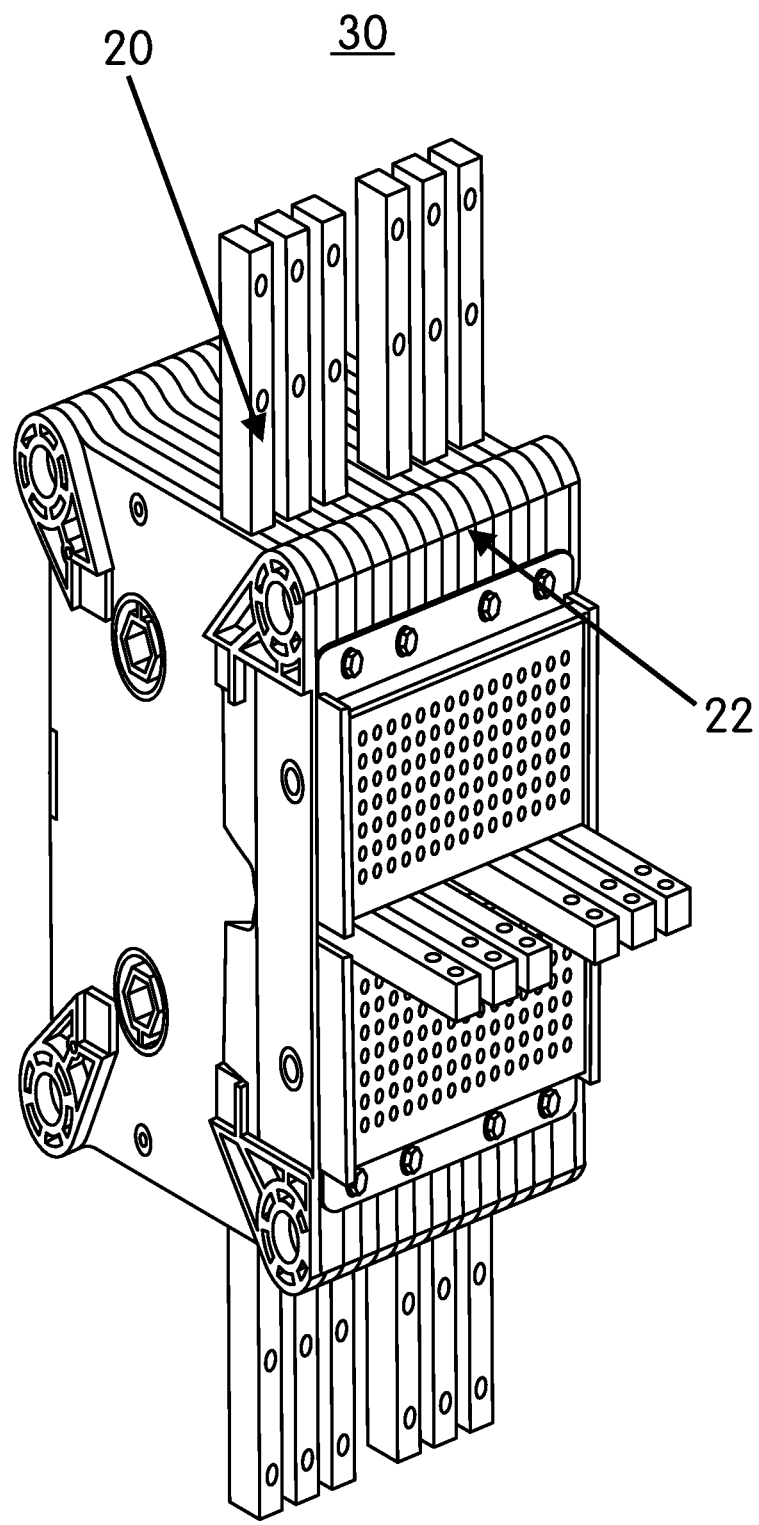
FIG. 2 depicts a front view of a cassette sub-assembly according to an embodiment.

It is noted that other points of lesser, but still increased, resistance due to design, such as at the connection of the T-joint 3 with the movable components 2 and 3, may also be used, and are contemplated. As also shown in FIG. 2, a load L is distributed at T-joint 3. A cassette 20 comprises a non-conducting part and is arranged with switching member 10 such that stationary components 1 project from first and second sides of cassette 20, with T-joint 3 projecting from a third side. Current I flows through one 'finger' of the assembly (e.g., the stationary component 1) and/or through the cassette 20. In at least one embodiment, a non-conductive dummy cassette without any current-carrying capability may be provided. It is noted that other ATS switching elements 10 having two or more source connections or other differing configurations are known in the art. It is also noted that these switching elements 10 may or may not be contained in a cassette format 20.

Figure 3:
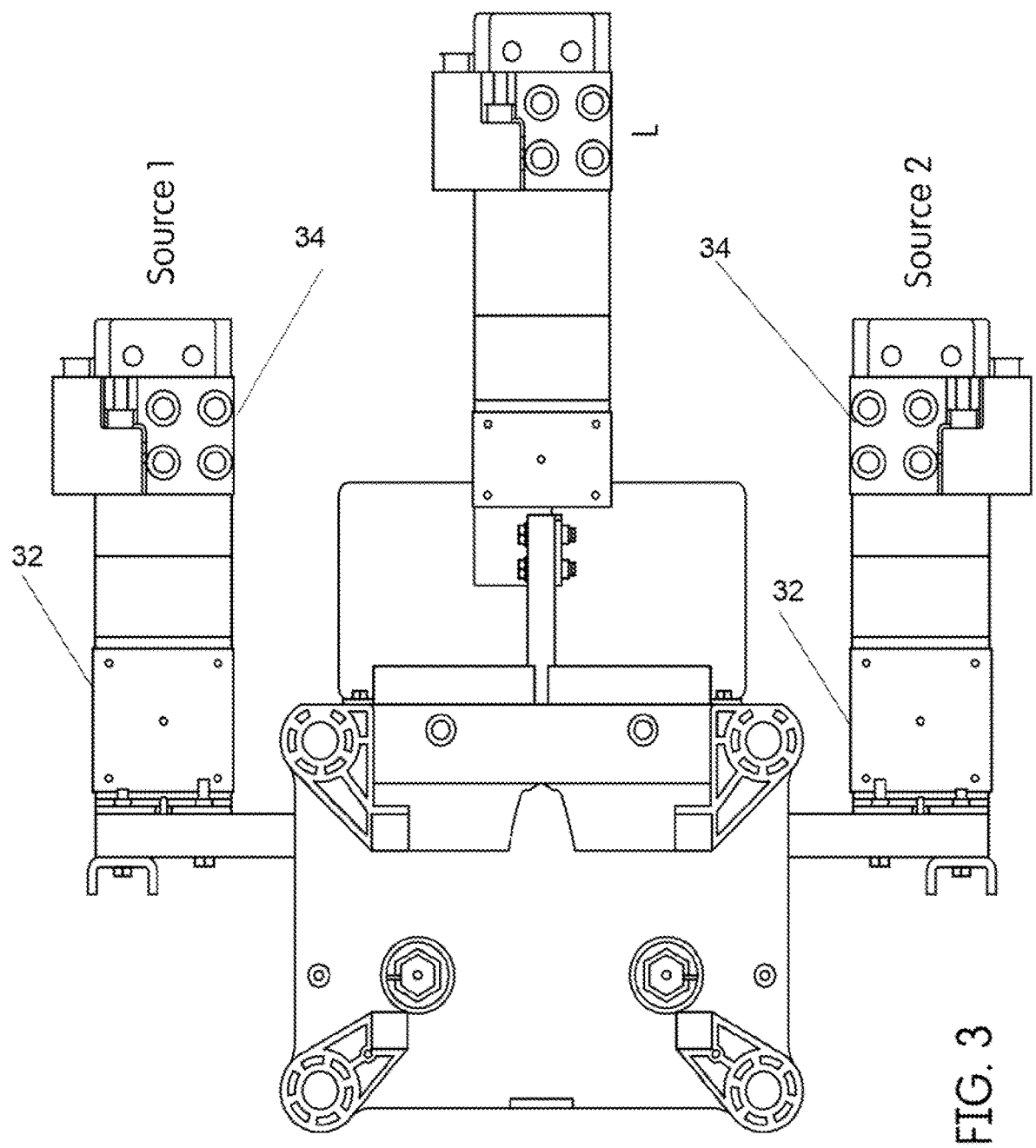
FIG. 3 depicts a cassette sub-assembly according to an embodiment.

FIG. 2 depicts a cassette sub-assembly 30 according to an embodiment. The cassette sub-assembly shown in FIG. 2 is a single phase assembly where six of the cassettes 20 assembled with the switching members 10 are stacked together, and between the stacked cassettes, a so-called 'dummy' or spacer cassette 22 is positioned. The spacer cassette 22 serves to separate the stacks of cassettes 20 from each other. In various embodiments, other numbers of cassettes may be stacked together. FIG. 3 depicts a cassette sub-assembly of an ATS device according to an embodiment arranged with a bus and lugs for each phase, with six cassettes stacked together per phase. Each switching member 10 as shown in FIG. 1 can couple a load L to a first source and/or a second source via operation of movable components 2 and 3. ATS switches generally have three phases, each with a one or more switching members 10/cassettes 20 in each phase, to couple loads to three phase power sources. However, it is noted that one, two, three, or more phase ATS switches are also known in the art. "Cathedral-style" buses 32 are provided for each phase. Lugs 34 are also arranged at terminals of the buses 32.

Figure 4B:
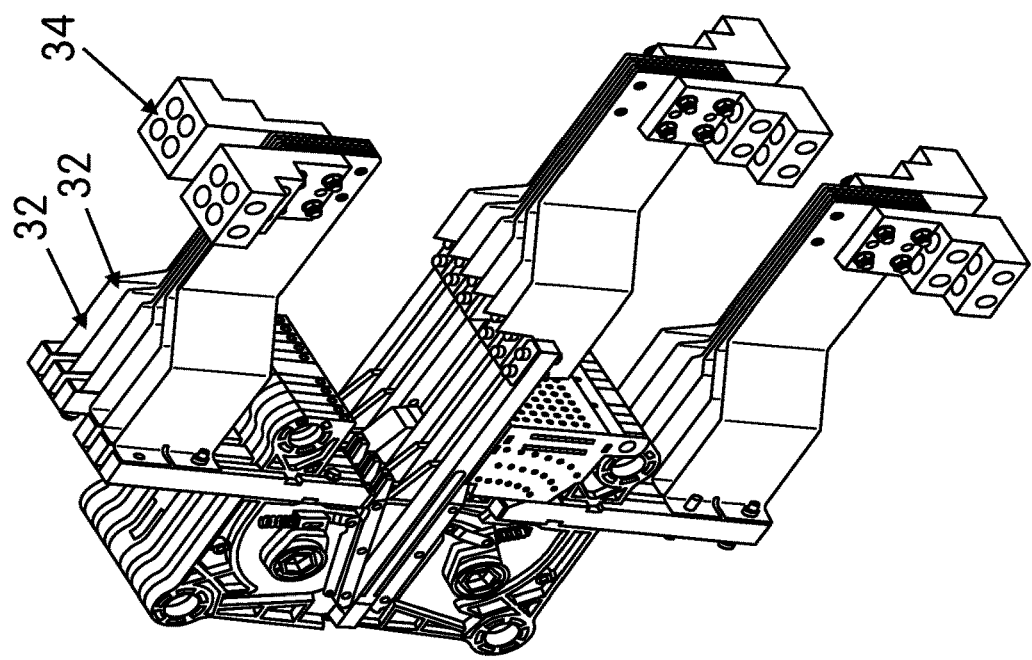
FIG. 4B depicts a perspective view of a single phase assembly of an ATS device.
Figure 4A:
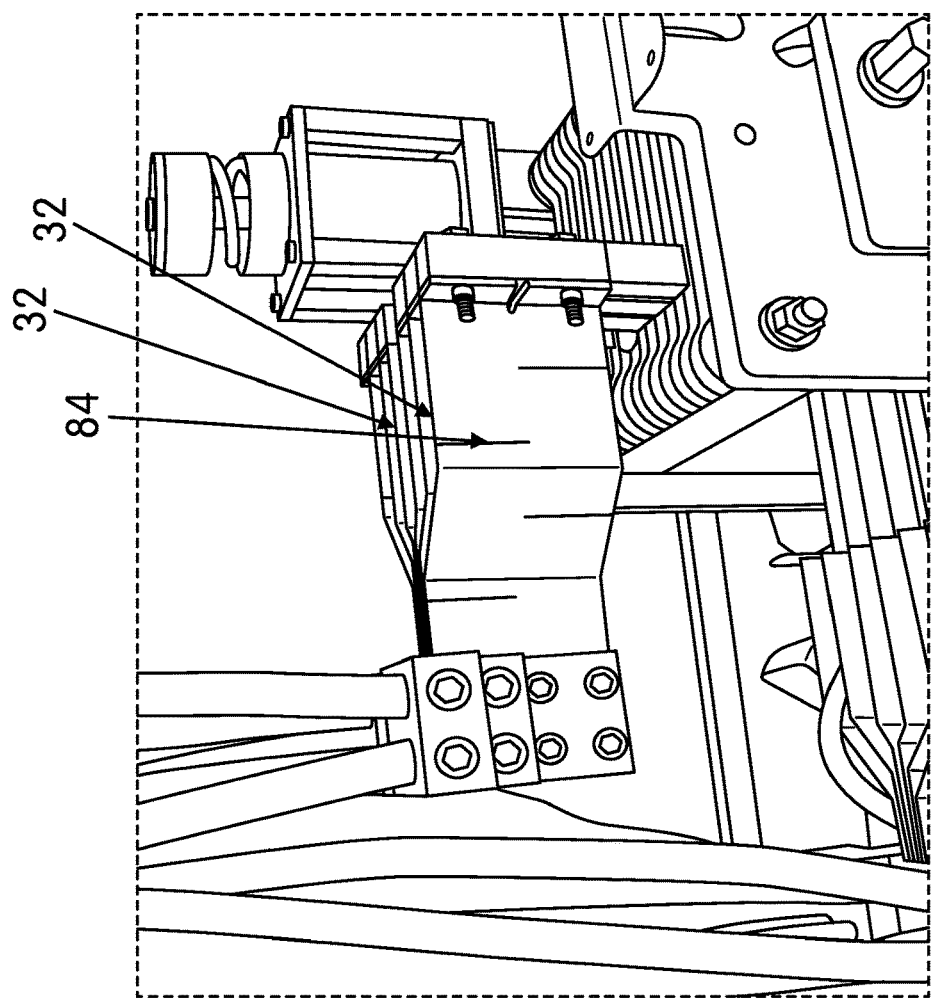
FIG. 4A depicts a side view of an ATS according to an embodiment.

FIG. 4A depicts a side view of a portion of a transfer switch according to an embodiment. More particularly, FIG. 4A depicts a side view of a portion of a single phase switch component of an ATS. As shown in FIG. 4A, the single phase switch component includes a plurality of bus conductors 32. The plurality of conductors 32 are arranged in parallel to each other. In the embodiment shown in FIG. 4A, at least one of the plurality of conductors 32 is configured with one or more slits 84 or slots therein. The slits 84 are cut-outs within the body of the conductor 32. In at least one embodiment, a plurality of equal-sized slits 84 may be provided at intervals along the length of the conductor 32.

In at least one embodiment, one or more of the slits 84 may be provided so as to have a different orientation and/or size (e.g., thickness and/or length) from another of the slits. The slits 84 in the current-carrying conductors advantageously reduce the effective width/size of the conductor 32 they have been placed into and so increase the resistance of the current path for that conductor 32, contributing to the current rebalancing effects described above. The slits may be formed, for example, by cutting the conductor in an alternating manner on opposite sides so as to produce a conductor with an effective width of the distance between the cuts or the depth of the cuts, whichever is smaller. Conductors 32 with increased resistance are generally placed on the outer edge of the cathedral buses to promote current rebalancing towards the conductors in center of the bus. It is noted that other methods of increasing the effective resistance of a conductor 32 may also be used and are contemplated, such as decreasing the width or overall size of the conductor, altering the conductor 32 material, or placing a resistive element or coating on connections of the conductor 32 to the ATS.

FIG. 4B depicts a perspective view of an embodiment of a transfer switch. As shown in FIG. 4B, the bus 32 and lugs 34 are arranged at different positions in the vertical direction with respect to the cassette sub-assembly 30. It should be noted that a wide variety of ATS configurations may be employed with the bus 32 and lugs 34 in various locations, and that the ATS may still further include additional components to carry out actuation and driving of particular systems and/or components. For example, in at least one embodiment, a first actuator may be provided between the first switch component and the second switch component, and a second actuator may be provided between the second switch component and the third switch component.

Figure 5A:
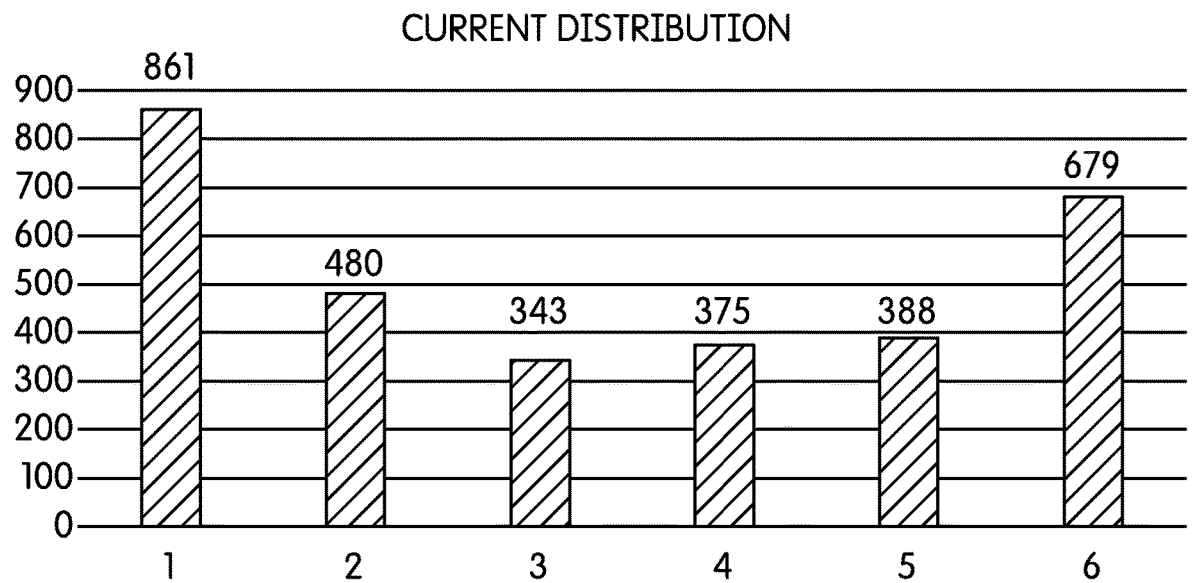
FIG. 5A depicts current distribution of the single phase assembly shown in FIG. 4B.
Figure 5B:
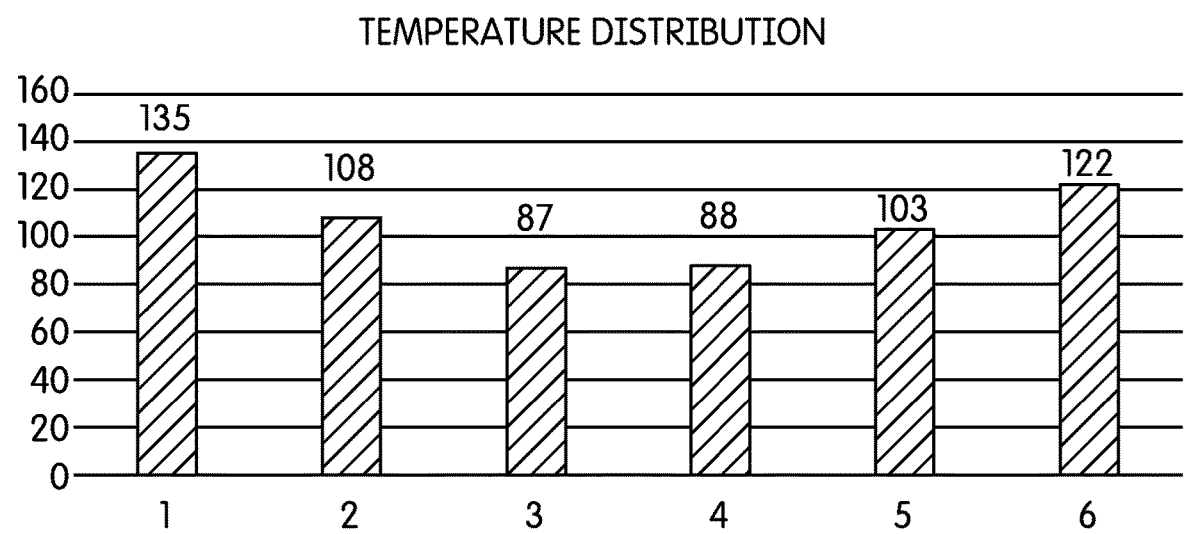
FIG. 5B depicts temperature distribution of the single phase assembly shown in FIG. 4B.

FIG. 5A depicts an example of a current distribution for each cassette in a single phase cassette assembly as shown in FIG. 4B, on a finger-by-finger basis. That is, the data shown in FIG. 5A represents the measured current for each finger of the six cassettes (respectively labeled 1 through 6) of a phase of the ATS. As seen from FIG. 5A, the current at the outer cassettes is generally far higher than in the interior cassettes, usually by a difference of at least three hundred Amperes. Temperature data was also measured, as shown in FIG. 5B. Temperature is proportional to power, which corresponds to the product of the resistance and current squared ($P=I^2*R$). Thus, temperature is proportional to the square of the current flow in a given finger/cassette of an ATS, and the high current flows in conventional 3-phase assemblies increases the overall operating temperature. The temperature distribution on a per-cassette basis varied similarly to the current distribution, with the cassette temperature being greatest at the ends of the system. The cassette temperature distribution is such that individual cassettes may be at or over their rated temperature limit while others in the cassette stack are not at or over their rated temperature limit, thereby limiting the current carrying ability of the cassette stack or ATS as a whole.

Figure 6B:
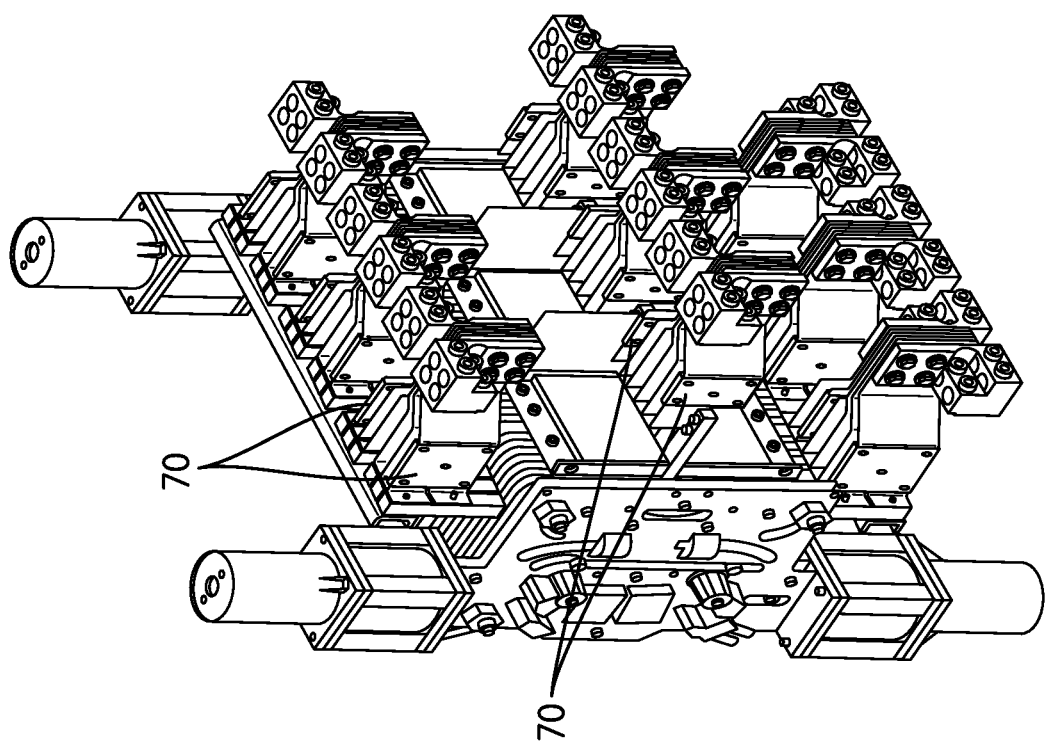
FIG. 6B depicts a three-phase assembly according to an embodiment.
Figure 6A:
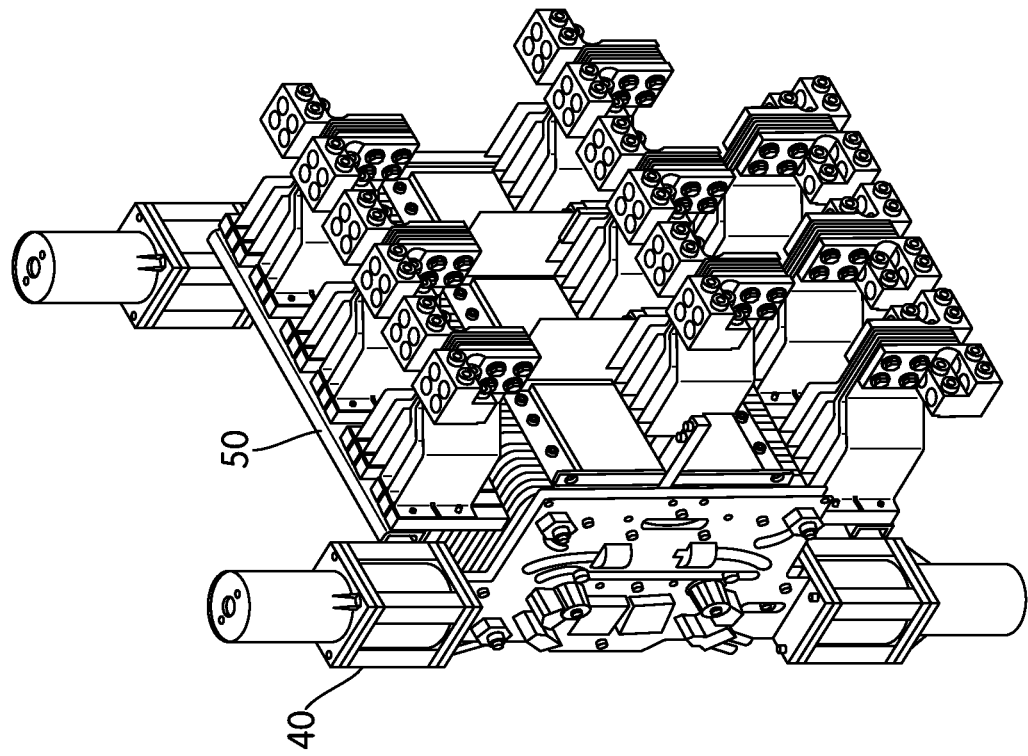
FIG. 6A depicts a three-phase assembly provided in a frame.

FIG. 6A depicts a three-phase assembly provided in a frame, according to an embodiment. Specifically, FIG. 6A depicts a three-phase assembly 50 assembled with a frame 40 as taken from a front perspective view. FIG. 6B depicts a three-phase assembly including a plurality of steel laminations, according to an embodiment. The configuration shown in FIG. 6B differs from that in FIG. 6A in at least the following aspects. Specifically, the three-phase assembly 50 is provided with a plurality of laminations 70 of electric steel on outside buses 32. Such laminations 70 may comprise plates or sheets which are added on outside buses 32 on line and/or load sides of a three-phase system shown in FIG. 6A. The laminations will be described below in more detail. The laminations may also be referred to as plates and are formed as plates or sheets.

The laminations 70 in at least one embodiment are positioned externally from the cassette assembly, and may be slipped over the bus bars to increase the electrical impedance of the outer conductors. That is, the laminations 70 may be disposed so as to cloak the bus bars and increase their impedance through electromagnetic induction effects in the laminations 70. Alternatively, generally speaking, in some embodiments, the resistance is increased by modifying the shape or characteristics of one or more conductors. For example, in at least one embodiment, the outer bus bars may be provided with one or more cuts or slits or otherwise reduced in size to increase the relative impedance of the bus bar, or one or more bus bars may be omitted from the center or middle of each cathedral bus/cassette stack to increase relative spacing, reduce electromagnetic interaction, and to control the current distribution to counteract the aforementioned skin effect and thereby achieve a more even flow distribution. Further, in some embodiments, the spacing between bus bars (including by omission of one or more bus bars) may be controlled so as to achieve a current rebalancing.

In some embodiments, at least two laminations are provided for each cassette stack in a three-phase assembly. In other embodiments, four or more laminations may be provided for each cassette stack in the three-phase assembly. For example, for phase A of a three-phase assembly, a first lamination 70 and a second lamination stack 70 may be disposed on outer and inner sides of the first switch component 10 or on either side of a conductor 32 of a bus coupled to the first switch component 10. Further, in at least one embodiment, a third lamination 70 is provided between the first switch component 10 and the conductor 32 of the bus, and the second switch component 10 and the conductor 32 of the bus, and a fourth lamination 70 is disposed between the second switch component 10 and the conductor 32 of the bus and the third switch component 10 and the conductor 32 of the bus.

It should be noted that the laminations of certain embodiments may vary in thickness or area to have differing impedance effects or to scale the impedance effect across the conductors 32, such as increasing impedance from center of the bus to the outer edge conductors 32. For example, in at least one embodiment, each of the first and second laminations 70 may have a first thickness, and each of the third and fourth laminations 70 may have a second thickness which is smaller than the first thickness. Further, in some embodiments, a distance between the third and the fourth laminations 70 may be less than a distance between the first and the third laminations 70 and less than a distance between the fourth and the second laminations 70. Additionally, in at least one embodiment, each of the first and second laminations 70 may comprise a first plurality of sheets, e.g., in a first lamination assembly, whereas each of the third and fourth plates may comprise a second lamination assembly having fewer sheets than the first plurality of sheets.

In particular, in at least one embodiment, a lamination 70 is formed of layers of electrical steel which are connected to each other, and which may be stacked in different configurations to achieve desired current reductions. For example, in at least one embodiment, three layers of electrical steel are provided, including two layers in a first orientation and a third layer in a second orientation. The second orientation may be in an inverted relationship to the first orientation. The three layers may be provided on each side of a particular bus, so as to wrap the bus completely. In some embodiments, four layers of electric steel may be provided in a lamination 70.

In some embodiments, the size of one or more buses may be reduced, or one or more of the buses may be cut on an outer conductor to increase impedance. In this manner, when the outer conductor 32 of the first phase switch component 10 is provided with a cut portion, the impedance along the first phase switch component 10 exceeds that along the second and third phase switch components. It is noted that other methods of increasing the effective impedance of a conductor 32 may also be used and are contemplated, such as decreasing the conductor width, thickness, or overall cross section, altering the material of the conductor 32 to one having a higher bulk material resistance, or placing one or more resistive elements in series or a resistive coating or paste on at least a portion of the conductor 32, such as on the connections of the conductor 32 (e.g., a first outer conductor). For example, when the first outer conductor 32 may be provided with a resistive element or a resistive coating so as to have a higher bulk material resistance than conductors without the resistive element or coating. Further still, in at least one embodiment, one or more conductors and/or cassettes in a cassette stack may be entirely omitted to increase such an air gap or clearance.

Additionally, in at least one embodiment, one or more so-called 'dummy' cassettes, i.e., plastic placeholder cassettes that do not contain switching members, may be used to reduce the skin effect and to rebalance the current load on the remaining conductors. The increased air gap due to the missing buses or dummy cassettes may contribute to additional cooling effects for the bus and cassette stacks due to increased air flow. Further, multiple air gaps may be provided, e.g., an air gap between cassettes of a first cassette sub-assembly, and an air gap between cassettes of a second cassette sub-assembly or increased lateral spacing of cassettes in a cassette stack, such as uniform lateral spacing or graduated lateral spacing to reduce skin effect and increase air flow.

In addition, in some embodiments, a lamination of electric steel 70 may be provided. Further still, an assembly comprising layers of electric lamination steel may be provided, which is disposed around at least one object such as a conductor, so as to effectively wrap at least a portion of the object (i.e., the conductor). Moreover, while at least one embodiment herein employs electric steel in a laminated form, i.e., in a lamination 70, some embodiments may include electric steel which is not laminated, so as to increase eddy currents where the electric steel is positioned. Further still, some embodiments may include a combination of laminated and non-laminated electric steel.

Figure 7C:
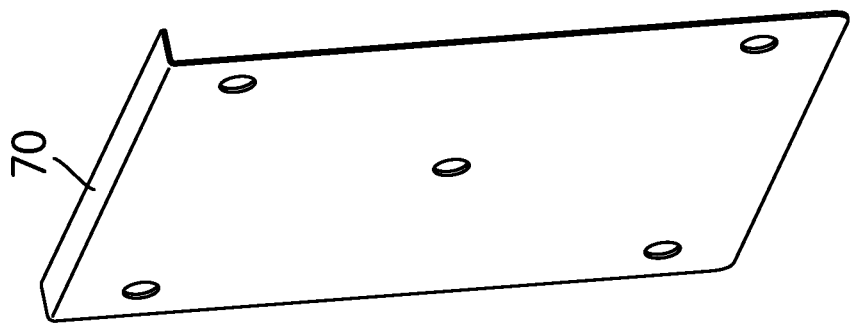
FIG. 7C depicts a single laminated plate according to an embodiment.
Figure 7B:
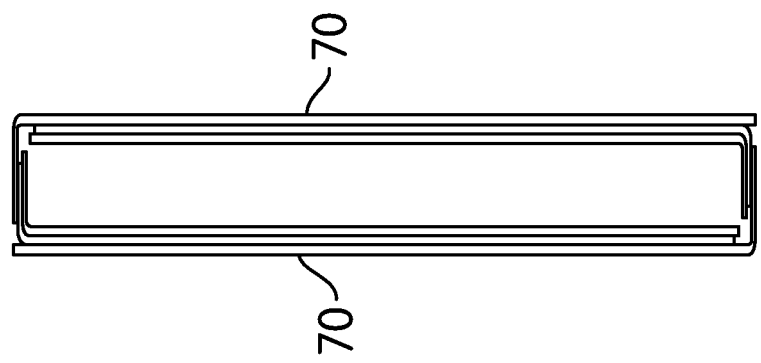
FIG. 7B depicts an assembly of laminated plates according to an embodiment.
Figure 7A:
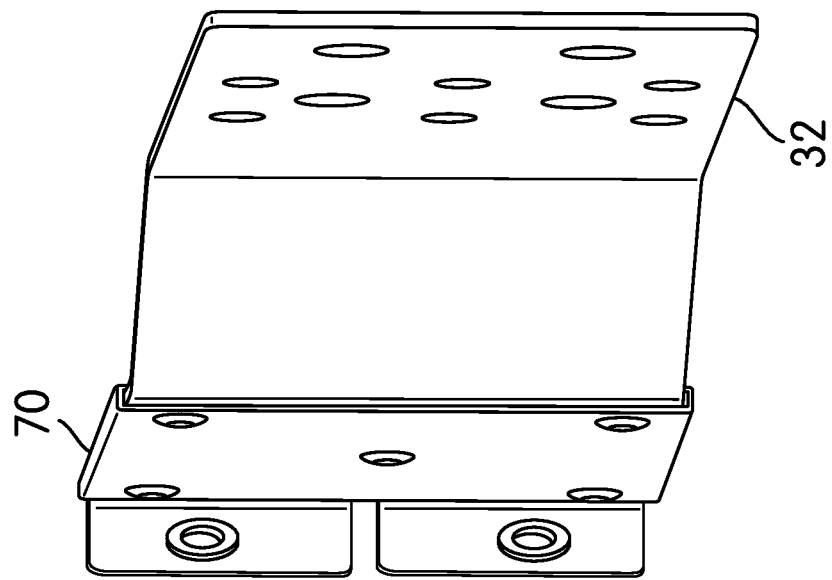
FIG. 7A depicts an assembly including a bus, according to an embodiment.

FIGS. 7A-7C depict laminations according to exemplary embodiments. In particular, FIG. 7A depicts a lamination 70 arranged with a bus 32. FIG. 7B depicts an assembly of laminated plates, that is, a plurality of laminated plates which are joined or otherwise assembled together. FIG. 7C depicts a single laminated plate comprising a substantially planar portion and a lip portion protruding beyond an edge of the planar portion. One or more apertures may be formed in the laminated plate.

In the embodiments shown in FIGS. 7A-7C, the laminations 70 are formed of electric steel. The laminations have conductivity and therefore influence temperature and current behavior of the three-phase assemblies. Moreover, the laminations serve as plates which effectuate a rebalancing of current throughout the ATS. In particular, the laminations are structured so as to effectuate a particular distribution of both current and temperature, as discussed below.

In certain embodiments, the electrical steel conforms to the specifications set forth in Standard GB/T 2521-96 (Cold-Rolled Grain-Oriented And Non-Oriented Magnetic Steel Strip, Standards Administration of China) and/or IEC 60404-8-4/7 (Magnetic materials—Specifications for individual materials—Cold-rolled non-oriented electrical steel strip and sheet delivered in the fully-processed state, 2013 ed.).

ATS devices according to certain embodiments as described herein were experimentally evaluated for their current and temperature distributions relative to comparative examples. Specifically, measurements were carried out on phase B, where the six cassettes of a cassette stack have respective fingers (conductors) B1, B2, B3, B4, B5 and B6. Due to its placement and shrouding from other phases, as well as induced impedance, phase B, which is the inner phase of any three-phase ATS, typically experiences the highest heat. Other measurements were carried out on phase A and phase C components, as discussed below. All current measurements were conducted with a Rogowski coil, while all temperature measurements were made using a J type thermocouple. Measurement values were subject to ±5-10% error.

Figure 8:
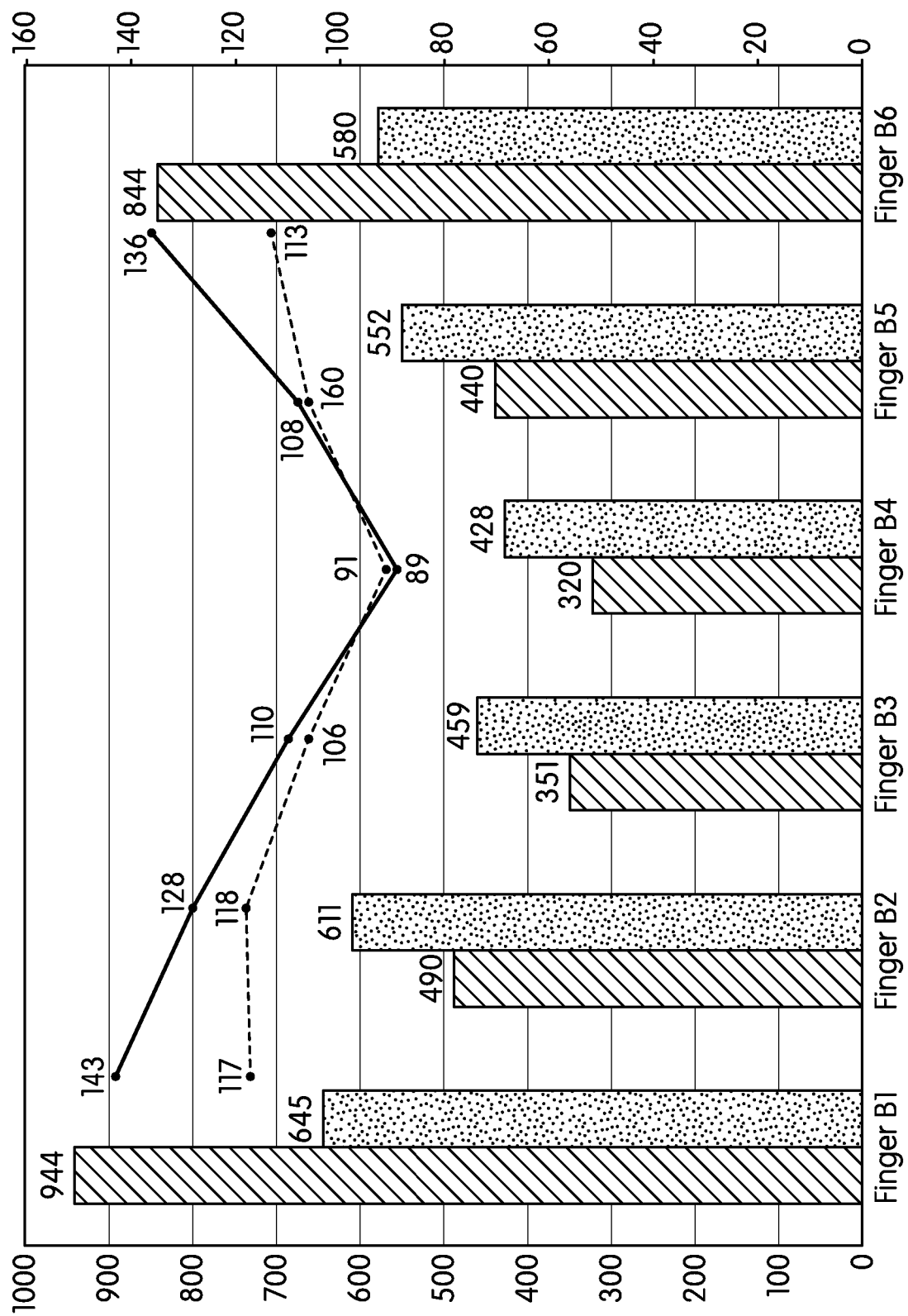
FIG. 8 depicts current and temperature distributions of three-phase assemblies.

FIG. 8 depicts current and temperature distribution data for an embodiment of a three-phase assembly as shown in FIG. 6B and a comparative example. The comparative example corresponds to the embodiment of the three-phase assembly shown in FIG. 6A, that is, it lacks the aforementioned laminations. FIG. 8 includes a bar chart with current measurement values and line plots with temperature measurement values. All current data is in Amperes (A) (left axis scale), and all temperature data is in degrees Celsius (right axis scale). The current measurements were taken for each finger (conductor) of a six-cassette stack in the three-phase assembly. Measured current values for the three-phase assembly of FIG. 6A are shown on the left of each bar column and measured current values for the three-phase assembly of FIG. 6B are shown on the right. The line plot in solid lines shows temperature data for the three-phase assembly of FIG. 6A, and the line plot in dashed lines shows temperature data for the three-phase assembly of FIG. 6B.

The temperature measurements for the embodiment of FIG. 6A were above (higher than) the temperature measurements for the embodiment shown in FIG. 6B, with the exception of the measurements at finger B4. The temperature measurements were taken at a movable tip of the switching members (e.g., at movable component 2). As reflected in FIG. 8, the temperature of current carrying components of an individual ATS cassette (e.g., the aforementioned stationary part, movable part, and T-bus) relates to the amount of current flowing through the cassette.

Certain embodiments as described above may be arranged inside a cabinet, such as a hardware cabinet at a power generation site (not shown). That is, the three-phase assembly may be disposed in a frame 40 as shown in FIG. 6A, and the frame 40 is in turn positioned inside the cabinet. In the embodiment of FIG. 6B, the bus 32 may attain a temperature of 58° C. and the lug 56 may attain a temperature of 60° C. as measured inside the cabinet. On the other hand, the embodiment of FIG. 6A was found to have a bus temperature of 65° C. and a lug temperature of 60° C.

Figure 9A:
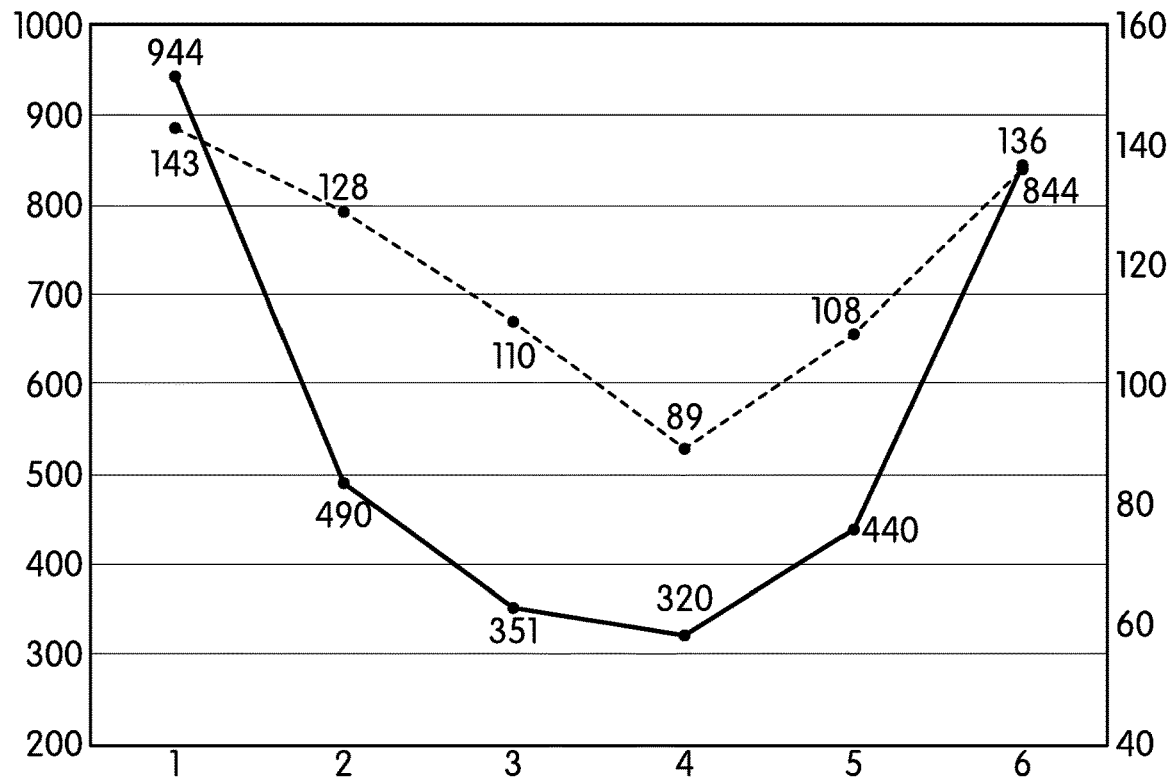
FIG. 9A depicts current and temperature distributions of a three-phase assembly.
Figure 9B:
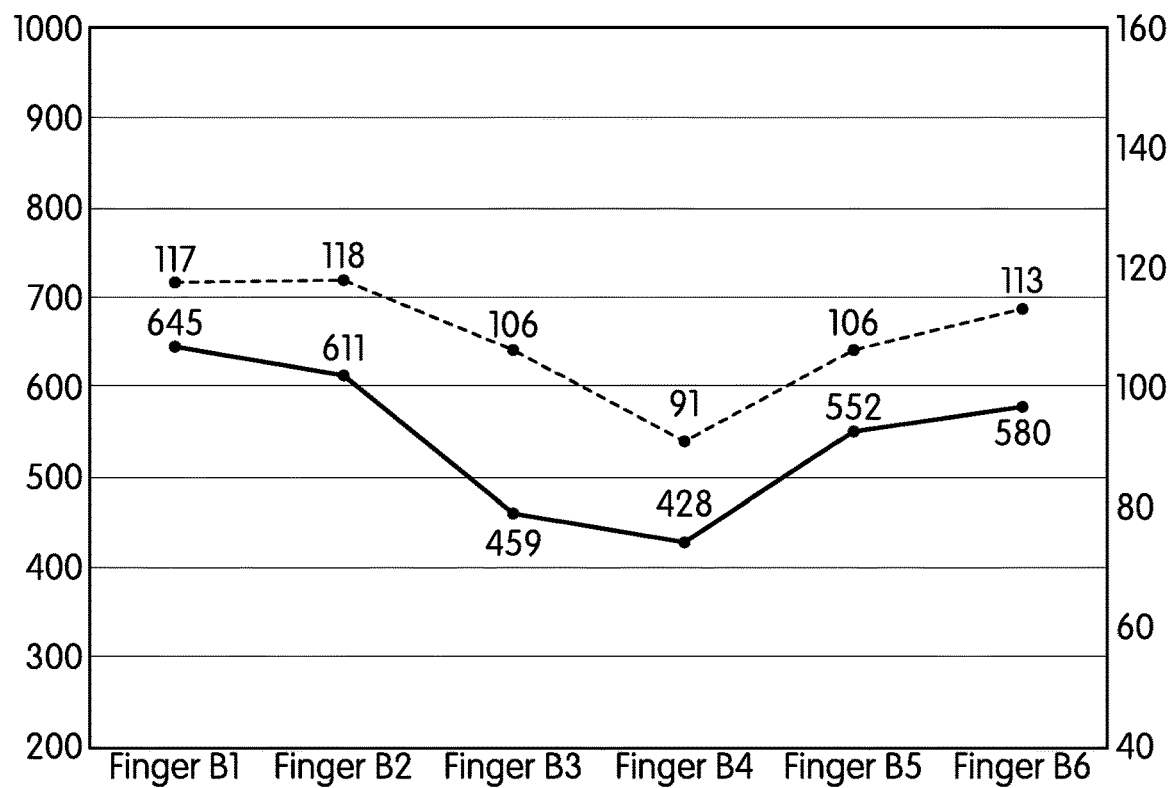
FIG. 9B depicts current and temperature distributions of another three-phase assembly.

FIG. 9A is a graph depicting current and temperature data of a three-phase assembly, specifically, the assembly shown in FIG. 6A. FIG. 9B is a graph depicting current and temperature data of another three-phase assembly, that is, the assembly shown in FIG. 6B. For each of the three-phase assemblies, current and temperature data were obtained for six fingers (conductors) of the six cassettes for phase B. The temperature measured values (in degrees Celsius) are shown in dashed lines, and the current measured values (in Amperes) are shown in solid lines. As seen from comparing FIGS. 9A and 9B, the current and temperature distributions of the three-phase assembly shown in FIG. 6B correlated more closely to each other than the distributions for the assembly of FIG. 6A. The temperature measurements were taken at a movable tip of the switching members (e.g., at movable component 2). It is noted that about two-thirds of the resistance in an ATS is in the switching member 10 of the cassette assembly, in particular in the contact of the moveable component 2. A lesser but still significant contribution to the resistance is the inside hinge contact on the movable component 2.

Figure 10A:
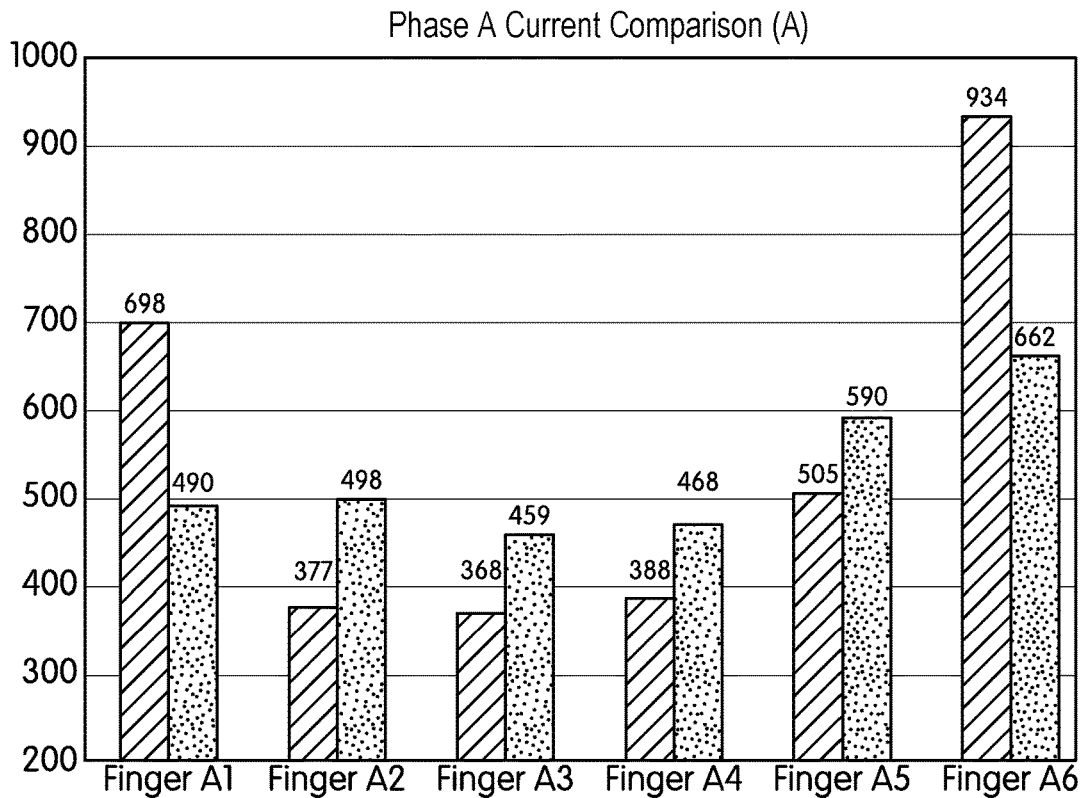
FIG. 10A depicts a current distribution for a first phase of three-phase assemblies.
Figure 10B:
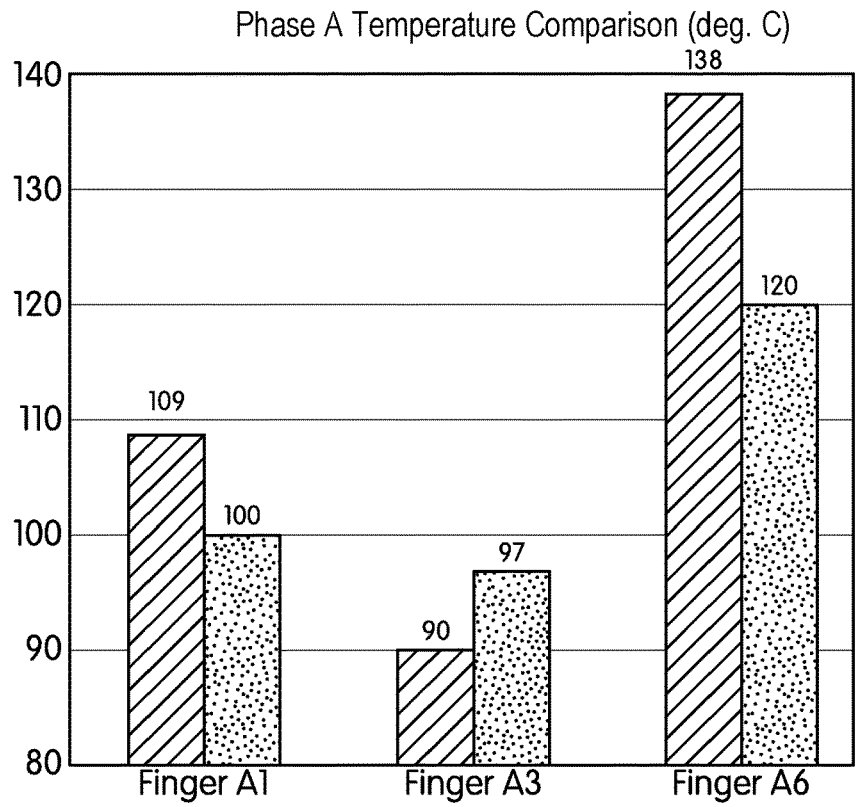
FIG. 10B depicts a temperature distribution for the first phase of three-phase assemblies.

FIG. 10A depicts current distribution data for three-phase assemblies. In particular, FIG. 10A is a bar chart showing measured values for current, in Amperes, taken at the six fingers of the phase A cassette for the phase assemblies shown in FIG. 6A (left side, with slanted lines) and FIG. 6B (right side, with stippling). FIG. 10B depicts temperature distribution data for three-phase assemblies. Namely, FIG. 10B is a bar chart showing measured values for temperature, in degrees Celsius, for select fingers of phase A. Specifically, the temperature values were measured at the movable tips of fingers A1, A3, and A6 (outer fingers A1, A6 and interior finger A3).

Figure 11A:
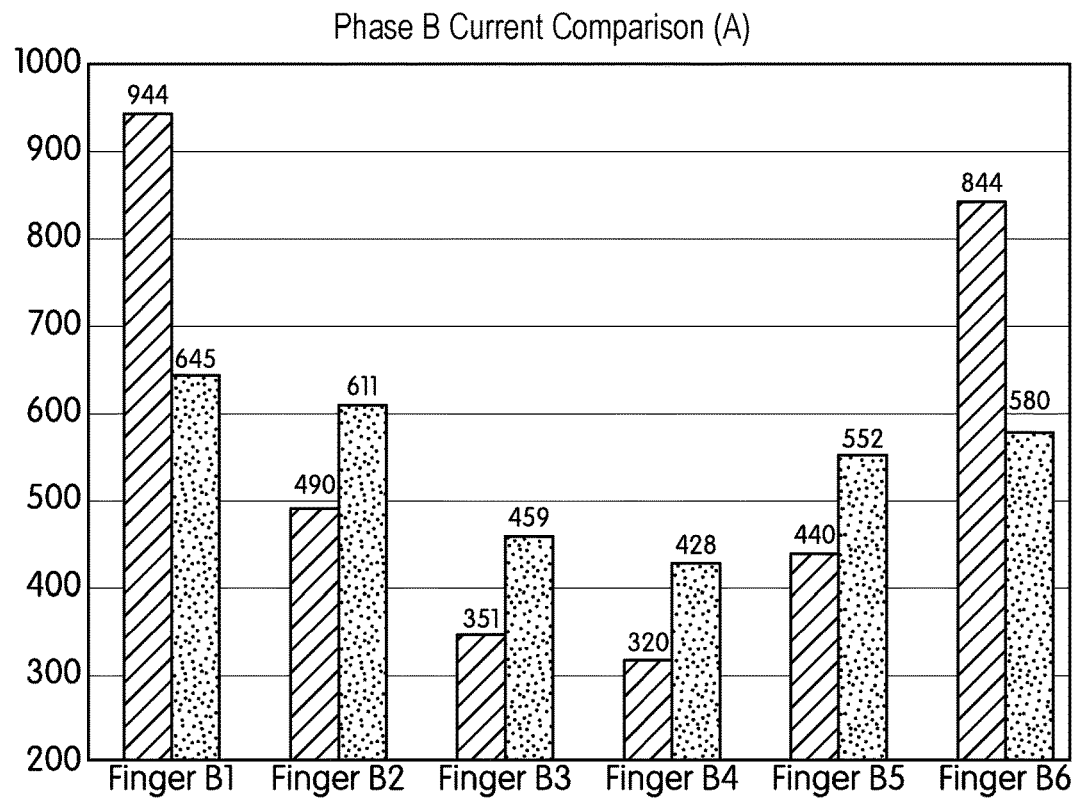
FIG. 11A depicts a current distribution for a second phase of three-phase assemblies.
Figure 11B:
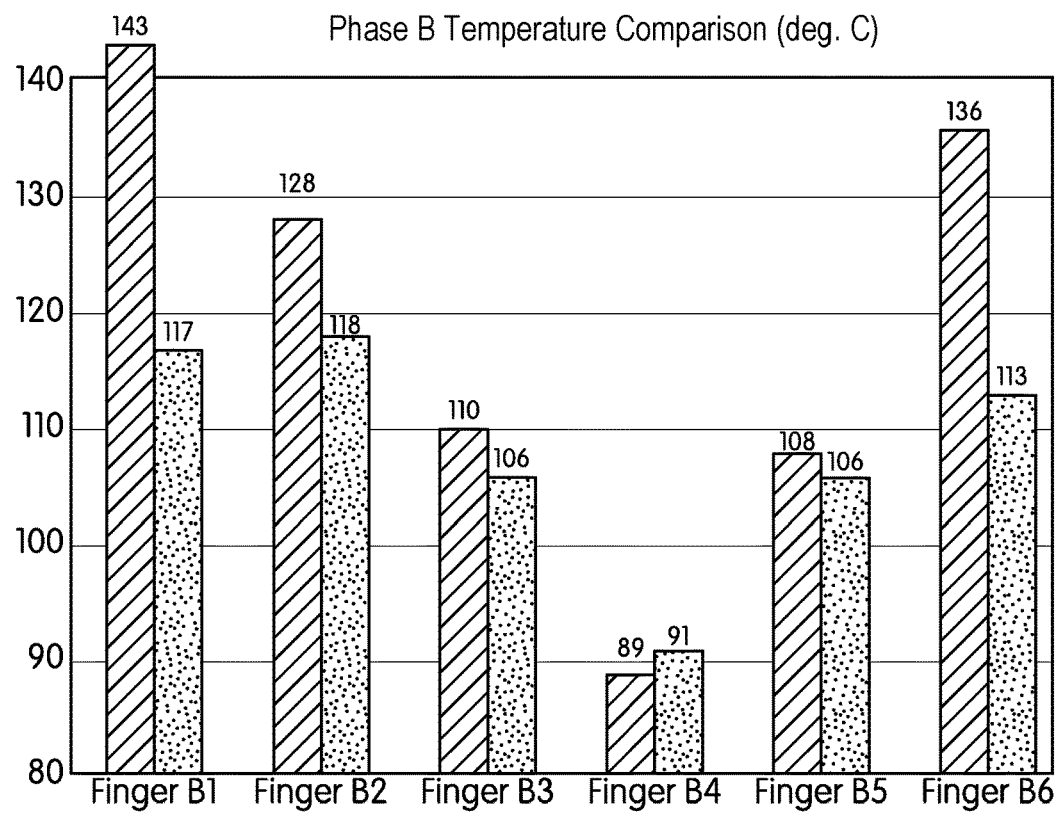
FIG. 11B depicts a temperature distribution for the second phase of three-phase assemblies.
Figure 12A:
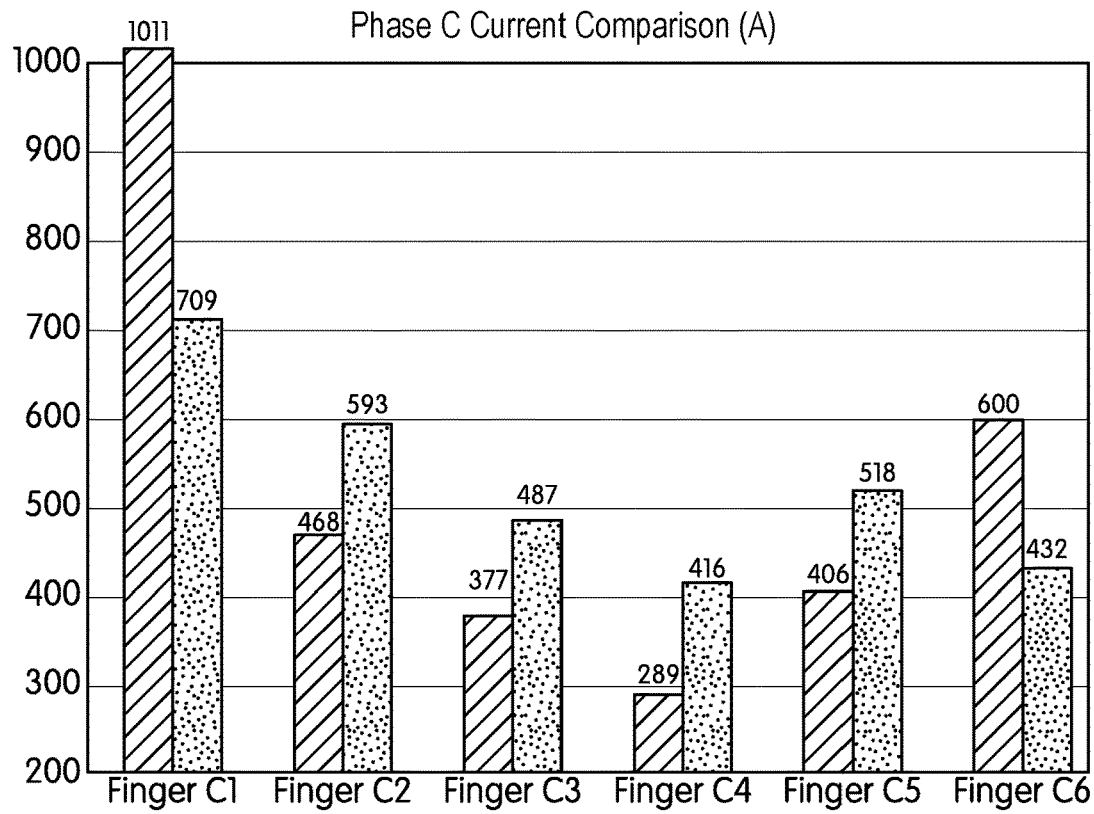
FIG. 12A depicts a current distribution for a third phase of three-phase assemblies.
Figure 12B:
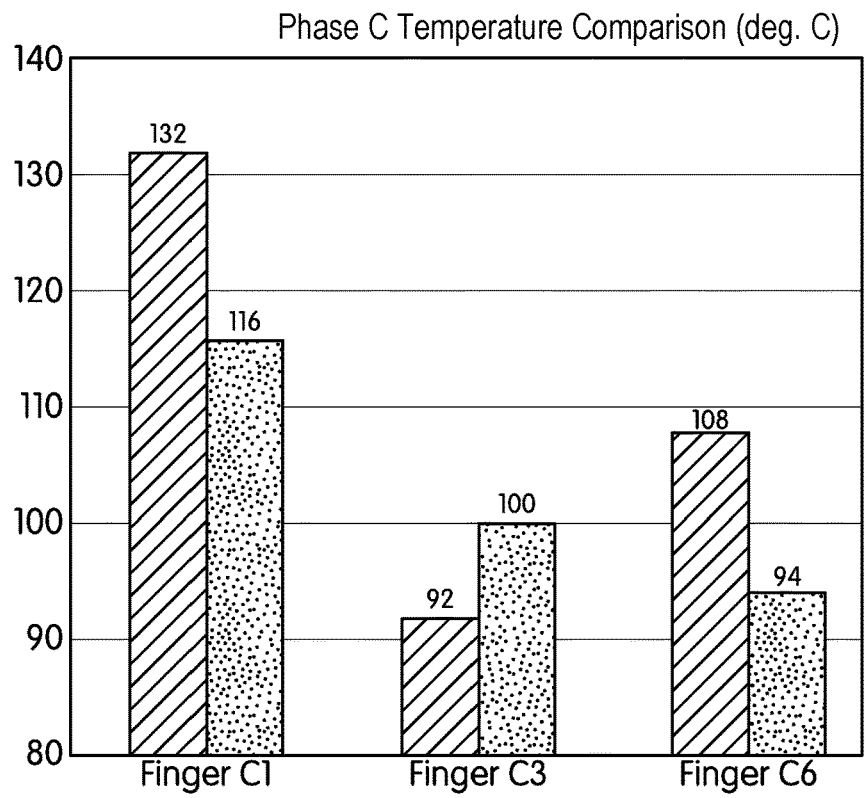
FIG. 12B depicts a temperature distribution for the third phase of three-phase assemblies.

FIG. 11A is a bar chart showing measured values for current, in Amperes, taken at the six fingers of the phase B cassette for the phase assemblies shown in FIG. 6A (left side, with slanted lines) and FIG. 6B (right side, with stippling). FIG. 11B is a bar chart showing measured values for temperature, in degrees Celsius, for six fingers B1-B6 of phase B. FIG. 12A is a bar chart showing measured values for current, in Amperes, taken at the six fingers of the phase C cassette for the phase assemblies shown in FIG. 6A (left side, with slanted lines) and FIG. 6B (right side, with stippling). FIG. 12B is a bar chart showing measured values for temperature, in degrees Celsius, for select fingers of phase C. Specifically, the temperature values were measured at the movable tips of fingers C1, C3, and C6. For all phases, at least the outer fingers of the phase assembly of FIG. 6B had reduced current and temperature.

The aforementioned evaluations revealed that embodiments with laminations made of electric steel may have a 300A drop in current in the outer conductors, as compared to assemblies without electric steel. Further, in the outer cassettes of the ATS, adding lamination plates may reduce the conductor's temperature by up to approximately 20%, thus significantly improving the long term thermal protection for ATS components and hence increasing the reliability and lifetime of ATS components. While certain embodiments may experience a localized heat increase, e.g., 3%-5%, the overall temperature and current distribution were substantially improved as compared to devices without electric steel.

Further, evaluation of an ATS according to at least one exemplary embodiment revealed that the three phases of the ATS exhibit unequal current distributions. Specifically, unequal current distributions were observed where outer cassettes carried a significantly higher current than interior cassettes, thereby contributing to an unequal distribution of temperature in the cassettes of each phase. By placing lamination sheets or plates on a bus connected to the outer cassettes on all the phases, the current in the outer cassettes was limited. Disposing the laminations on the bus in this manner, or otherwise increasing their impedance, served to cause more current to be directed to the inner cassettes. In particular, placing the laminations as described above allows for control of amount of impedance on the outer conductive elements so as to direct a flow of current to an interior conductor disposed between the outer conductors. In at least one embodiment, an outer conductor such as the lamination 70 is configured to increase an induction impedance of the outer conductor so as to exceed an induction impedance of an interior conductor. Situating the laminations 70 on outer conductors of the ATS increases the induction impedance (due to the magnetic field) on the outer conductors counteracts the skin effect of parallel current flows and pushes current back to center conductors, which are not covered by electric steel, thereby achieving a rebalanced current flow.

Various embodiments may have different numbers of lamination plates, and the sheets or plates may have differing geometries, shapes, orientations, and locations relative to their ATS components. The configuration of lamination plates may be made so as to achieve a desired current balancing effect. In at least one embodiment, a significant improvement in temperature distribution was observed. By rebalancing the overall temperature, long term thermal protection for the ATS may be achieved, which helps to increase the reliability and longevity of the ATS. In particular, by decreasing the operating temperature by about 12.2° C. or (10° F.) of a cassette in an ATS application may approximately double the lifespan of a cassette.

Accordingly, by placing laminations of electric steel on conductors of a bus, increasing outer bus connector/cassette impedance, or increasing air gaps, or omitting cassettes or conductors from a bus, a rebalancing of current may be achieved which improves the system lifespan and helps to satisfy applicable electrical code and/or UL guidelines for maximum current flows in conductors. By rebalancing and lowering the current distribution as described above, the effective maximum total current which can be carried by an ATS may be increased. Further, the incorporation of laminations of electric steel may enhance the structural rigidity and strength of certain embodiments, and also provide at least one support surface. For example, at least one of the first or second laminations 70 may support a driving mechanism configured to drive movement of at least one of the pluralities of cassettes which is disposed on a surface of the at least one of the first or second laminations 70.

At least one further embodiment of the disclosure relates to a method. The method includes, among other things, arranging a first switch component comprising a first plurality of cassettes, a second switch component comprising a second plurality of cassettes, and a third switch component comprising a third plurality of cassettes in order of the first switch component, the second switch component, and the third switch component, in a line. That is, as shown in FIG. 6B, for example, phase A, B and C switch components may be arranged in a linear order. The method further includes disposing a first plate (such as lamination 70) on an outer conductor (e.g., bus 32 and/or lug 34) located at an outer side of the one or more of the switch components at a terminal end of the switch component. The method still further includes disposing a second plate (another lamination 70) on an outer conductor located at an outer side of the one or more of the switch components at a terminal end of the switch component. The first and second plates are assemblies of laminated electric steel.

In certain embodiments, the method may include further operations. The method further includes providing the at least one cassette or conductor with a first lamination assembly or a second lamination assembly, and arranging the first and second lamination assemblies around outer conductors, respectively, such that the first and second lamination assemblies are provided concentrically around the outer conductors.

Further, an additional embodiment of the disclosure relates to a method for rebalancing current along a phase switch component using an air gap. The method includes, among other things, providing a first air gap between at least a first cassette and a second cassette of the first plurality of cassettes. In particular, the air gap comprises a clearance which increases the lateral spacing of cassettes in a cassette stack. One or more air gaps may be provided to achieve uniform lateral spacing or graduated lateral spacing to reduce the skin effect and increase air flow along the phase switch component. The method may further include providing a second air gap is provided at least between a first cassette and a second cassette of the second plurality of cassettes.

In some embodiments, the method includes providing an air gap by omitting at least one of a conductor or a cassette. Further still, an additional embodiment of the disclosure relates to a method for rebalancing current along a phase switch component by controlling the physical attributes of the conductor 32. The method includes reducing the size or cross-sectional area of the conductor 32 of at least one phase switch component 10, so as to increase impedance along the phase switch component 10. More specifically, the thickness and/or width of the conductor 32 is reduced. In at least one embodiment, controlling the attributes of the conductor 32 comprises altering the material of at least a portion of the conductor 32 so as to have a higher bulk material resistance. Further, one or more connectors of the conductor 32 may be provided with a resistive element or a resistive coating or paste. Additionally, in at least one embodiment, controlling the attributes of the conductor 32 includes cutting into the conductor 32 such that the conductor is provided with a cut portion. By providing the cut portion, the impedance along the first phase switch component 10 is increased.

It should be noted that the term "example" may be used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various example embodiments without departing from the scope of the present invention.

While this specification contains specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be omitted from the combination, and the claimed combination may be directed to a subcombination or variation of a subcombination.

What is claimed is:

1. An automatic transfer switch comprising:
   a first phase switch component comprising a first plurality of cassettes;
   at least one outer bus component disposed at an outer side of the first phase switch component; and
   a first plate disposed on the outer side of the first phase switch component at a terminal end of the first phase switch component,
   wherein the first plate is structured to increase impedance on an outer bus component of the first phase switch component to rebalance current along the first phase switch component.

2. The automatic transfer switch of claim 1, further comprising:
   a second plate disposed between the first phase switch component and a second phase switch component; and
   a third plate disposed between the second phase switch component and a third phase switch component.

3. The automatic transfer switch of claim 2, wherein:
   the first and second plates comprise laminations of electric steel.

4. The automatic transfer switch of claim 2, wherein:
   each of the first and second plates comprises a first lamination assembly having a first thickness; and
   the third plate comprises a second lamination assembly having a second thickness which is smaller than the first thickness.

5. The automatic transfer switch of claim 2, further comprising:
   a plurality of movable contact members including at least one first movable contact member at a first location, at least one second movable contact member at a second location, and at least one third movable contact member at a third location,
   wherein the at least one first movable contact member is configured to move the first plurality of cassettes, the at least one second movable contact member is configured to move the second plurality of cassettes, and the at least one third movable contact member is configured to move the third plurality of cassettes, wherein at least one of the first and second plates comprises a first lamination assembly, wherein a first air gap is provided between at least a first cassette and a second cassette of the first plurality of cassettes, and wherein a second air gap is provided at least between a first cassette and a second cassette of the second plurality of cassettes.

6. The automatic transfer switch of claim 2, wherein an air gap is disposed between at least one of the plurality of movable contact members and another of the plurality of movable contact members.

7. The automatic transfer switch of claim 2, wherein a distance between the second and the third plates is less than a distance between the first and the second plates.

8. The automatic transfer switch of claim 3, wherein the laminations of electric steel comprise a plurality of layers of electric steel which are connected to each other.

9. The automatic transfer switch of claim 2, wherein:

each of the first and second plates comprises a first lamination assembly having a first plurality of sheets, and the third plate comprises a second lamination assembly having a second plurality of sheets having fewer sheets than the first plurality of sheets.

10. An automatic transfer switch assembly, comprising:

a first phase switch component comprising a plurality of conductors, wherein the plurality of conductors comprise a plurality of interior conductors disposed between a first outer conductor on a first side of the first phase switch component and a second outer conductor on a second side of the first phase switch component;

wherein at least one of the conductors comprises a cut portion configured to increase impedance along the first phase switch component to rebalance current along the first phase switch component.

11. The automatic transfer switch assembly of claim 10, wherein the first phase switch component comprises a plurality of contact cassettes.

12. The automatic transfer switch assembly of claim 10, further comprising a second phase switch component, wherein the first outer conductor comprises the cut portion and is configured to increase the impedance along the first phase switch component so as to exceed an impedance of the second phase switch component.

13. The automatic transfer switch assembly of claim 10, wherein the first outer conductor comprises a resistive coating on at least a portion of the first outer conductor.

14. The automatic transfer switch assembly of claim 13, wherein a cross section of the first outer conductor is reduced relative to the second outer conductor such that an impedance of the first outer conductor is higher than an impedance of the second outer conductor.

15. The automatic transfer switch assembly of claim 10, wherein:

the first phase switch component connects a first source and a load, and a plurality of cassettes provided in the first phase switch component includes at least one non-conductive cassette.

16. The automatic transfer switch assembly of claim 11, further comprising:

a gap provided between adjacent contact cassettes of the plurality of contact cassettes.

17. A method, comprising:

arranging a first switch component comprising a first plurality of cassettes, the first plurality of cassettes comprising outer cassettes and interior cassettes disposed between the outer cassettes;

disposing a first plate on a first outer conductor located at a first outer side of the first switch component at a first terminal end of the first switch component; and disposing a second plate on a second outer conductor located at a second outer side of the first switch component at a second terminal end of the first switch component, the first and second outer conductors sandwiching a plurality of interior conductors therebetween, and rebalancing current along the first phase switch component so as to increase impedance along the first phase switch component.

18. The method of claim 17, further comprising:

removing at least one interior conductor located between the first outer conductor and the second outer conductor; and arranging first and second lamination plates around the first and second outer conductors, respectively.

19. The method of claim 17, further comprising:

controlling an amount of impedance on the outer conductors so as to direct a flow of current to an interior conductor disposed between the outer conductors.

20. The method of claim 17, wherein rebalancing current along the first phase switch component comprises at least one of (1) reducing a size of at least one of the conductors, (2) reducing a cross sectional area of at least one of the conductors, or (3) providing a resistive element or coating on at least one of the conductors.

* * * * *